Figure 1:
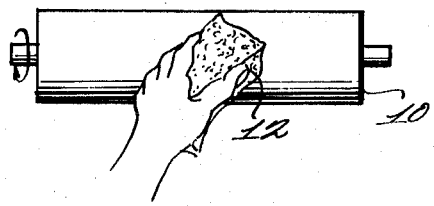

June 21, 1966  H. M. LEWIS ETAL  3,257,251
MANUFACTURING EMBOSSING MATRIX WITH STUCCO OR LIKE PATTERN
Filed Nov. 30, 1962

INVENTORS
HARRY M. LEWIS
WILLIAM H. ROHLOFF
BY Cushman, Darby & Cushman
ATTORNEYS 3,257,251
MANUFACTURING EMBOSSING MATRIX WITH STUCCO OR LIKE PATTERN
Harry M. Lewis, Springfield, and William H. Rohloff, Little Falls, N.J., assignors to Modern Engraving and Machine Company, Hillside, N.J., a corporation of New Jersey
Filed Nov. 30, 1962, Ser. No. 241,325
2 Claims. (Cl. 156—8)

This invention relates to manufacturing embossing matrices with a stucco or like pattern. More particularly, the invention relates to engraving such a pattern in the surface of an embossing cylinder or roll.

In the past, embossing rolls have been manufactured by rotating a small pattern roller, generally referred to in the art as a "mill," against the acid resist coated surface of a potential larger and longer embossing cylinder, stepping axially one circumferential strip after another, to remove the resist in certain areas, so as to expose the metal of the potential embossing roll. After impressing the full pattern area of the coated surface of the cylinder with the pattern applied by the mill, the cylinder was then etched by being rotatively dipped in an acid bath, to remove metal from the exposed areas. Such a process for making an embossing roll is fully described in the Sunderhauf et al. Patent 2,662,002. The acid resist applied to the potential embossing roll was coated thereon all over the full pattern area.

In accordance with the Sunderhauf et al. process, it has been the practice in the past to manually or otherwise engrave a die, which the art knows as a small cylinder of the same size as the mill but with its pattern in recess, with a stucco or like pattern, when it is desired to make one or a mated set of embossing rolls with such a pattern. The pattern on the die was then transferred to the mill, and in turn transferred circumferential strip by circumferential strip to the first embossing roll. This process has invariably caused, in the products produced from such embossing rolls, an undesired directional secondary pattern in the desired basic non-directional stucco pattern. The industry using embossing rolls of this nature has required that the secondary pattern be removed. At first blush, this removal problem would appear to be simply solved by tooling-out the secondary pattern, but as soon as a hand tool or the like is utilized on the die, mill, or embossing rolls themselves, a more uniform secondary pattern automatically results, contrary to the effects desired.

The problem has been overcome, however, by the instant invention, which dispenses with the die and mill processes of the prior art, and therefore the expensive hand-tooling utilized in making the die. In accordance with the present invention no secondary pattern whatsoever, is effected, but the stucco or like pattern instead is completely non-directional.

It is therefore an object of this invention to provide a process for manufacturing an embossing matrix by engraving metal with a stucco or like pattern that contains no secondary pattern but is completely non-directional.

This object is accomplished, in one embodiment of the invention, by manually disposing an etching resist onto a piece of metal in patches, leaving exposed metal areas between and around the patches, and then etching the exposed metal areas to remove metal therefrom. These two steps are repeated as many times as desired to obtain the pattern and depth required. The resist is then removed, following which the resultant embossing roll may be touched-up if necessary to remove any sharp edges, burrs, or the like. Once the embossing roll is seemingly satisfactory, it is hardened, as by conventional flame hardening equipment, and then utilized in the manner indicated in the above mentioned Sunderhauf et al. patent to make a matingly matching second embossing roll. From these matched embossing rolls, a sample product may then be effected to determine whether the rolls damage or show any tendency to damage the sample. If so, then the metal that effects such damage or tendency may be removed from the roll or rolls, as by a wire brushing or overall etching technique on the roll or rolls.

Figure 2:
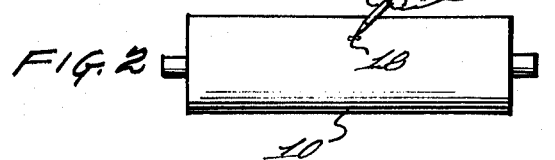
Figure 3:
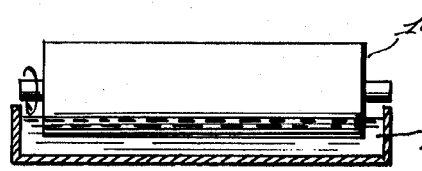
Figure 4:
Figure 5:
Figure 6:
Figure 7:
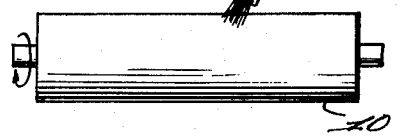
Figure 2A:
Figure 8:
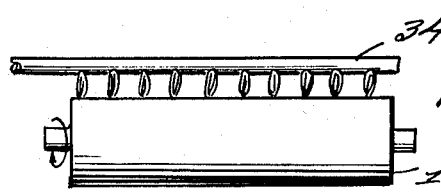
Figure 8:

These features of the invention are objects thereof, and others will become apparent upon reading the appended claims and the following detailed description in conjunction with the drawings, in which:

FIGURE 1 illustrates the step of dabbing resist onto an embossing roll with a sponge, FIGURES 2 and 2A depict the step of scratching away spots of resist in relatively large patches thereof that result from the sponge dabbing of FIGURE 1, FIGURE 3 illustrates the step of etching the cylinder resulting from FIGURE 2, FIGURE 4 refers to washing the resist off the cylinder, FIGURE 5 depicts spraying the washed cylinder with resist, FIGURE 6 illustrates another etching of the cylinder, FIGURE 7 shows removing sharp edges, burrs, etc. from the etched cylinder by use of a wire brush wheel, and FIGURE 8 illustrates the step of flame hardening the resultant embossing roll.

To effect an embossing matrix or, more specifically, an embossing roll as now described, with a stucco or like design or pattern, a journalled cylinder 10, whose cylindrical surface is smooth and preferably finish ground, has an etching resist manually disposed onto its cylindrical surface. The resist is an acid-resistant material, such as an asphalt base composition, for example.

Preferably, the resist is manually dabbed onto cylinder 10 with a sponge 12. Any type sponge may be employed, for example, natural sponge or synthetic resin sponges, including foamed polymers such as polyurethane, polyvinylacetal and sponge rubber (natural or synthetic). Dabbing of the resist with sponge 12 is effected over the full potential pattern area of the cylindrical surface sufficiently to give a fine, medium, or coarse pattern as desired. In any case, the sponge dabbing disposes a multiplicity of resist patches on the pattern area of the cylinder at random locations and with random configurations or outlines, for example as may be noted in FIGURE 2A, wherein numeral 14 refers to some of the patches. It will be noted that the patches not only vary randomly in outline but also in area, some being rather small, others quite large, and still others of intermediate sizes.

It may be frequently desirable, once the dabbing of the resist onto the cylinder is completed, to sub-divide or remove spots of resist from certain of the larger patches. This is shown being manually accomplished in FIGURE 2 by utilizing a sharp pointed tool 16 on an area 14 in the overall area 18 shown enlarged in FIGURE 2A. In the case illustrated, there are exposed metal areas 20 in-between and surrounding each of the patches 14, and tool 16 makes an additional exposed area 22 by removing a spot of resist in the midst of a large resist patch 14. Such exposure of additional metal areas may be effected all over the cylinder, to the extent desired.

After the required pattern of resist is effected onto the cylinder in FIGURE 2, that cylinder is then etched as by rotating the cylinder in an acid bath 24 shown in FIGURE 3. This removes metal from the exposed metal areas 20, etching being allowed to proceed sufficiently to effect a shallow depth etch. Then, the steps of FIGURES 1 and 3, and that of FIGURE 2 if desired, are repeated several times, for example two or three more times, to give the pattern and depth thereof desired.

After the desired pattern is etched into cylinder 10, the resist that then remains on the cylinder is removed therefrom, as by washing it off with water from nozzle 26 in FIGURE 4. At this stage, there is basically provided an embossing roll with a stucco or like pattern. It may be desired, however, to improve the roll in several respects. First of all, any sharp edges or the like that the cleaned roll of FIGURE 4 contains are desirably removed. This may be done in any desired manner, for example as by etching the cylinder over all its surface to round such sharp edges or the like. After this, the roll is again washed in a manner similar to that indicated in FIGURE 4.

If it is now desired to give the etched and cleaned cylinder of FIGURE 4 a matting effect, etching resist may be sprayed, as from nozzle 28 in FIGURE 5, onto the cylinder as it is rotated. Spraying has the tendency to fill the valleys or recesses in the cylindrical surface to the degree desired, so that the surrounding hills may be truncated or otherwise matted down by the subsequent etching in the acid bath 30 of FIGURE 6. Another cycle or cycles of the FIGURES 5 and 6 spraying and etching steps may be effected as necessary, to give the desired matting effect. After the last etching, the cylinder is again cleaned, as in FIGURE 4 with a water wash for example.

As a result of the etching of FIGURE 6, there may be found sharp edges or burrs that need to be removed from the cylinder so that any product embossed thereby will not be damaged or tend to be damaged thereby as by fracturing. Such sharp edges, burrs, or the like may be removed by an overall etching of the cylinder, but are preferably removed by rotating a wire brush 32 (FIG. 7) which is disposed on a flexible shaft 34, against the cylindrical surface of cylinder 10. The cylinder may be rotated during this time if desired.

After removing or rounding any sharp edges, etc., the cylinder is then ready to be hardened. This may be accomplished in any desired manner, for example as by the conventional flame hardening technique indicated in FIGURE 8. The flame issuing from multi-apertured torch 34 causes a surface hardening effect, full depth hardening of the cylinder at this point being perhaps undesirable from the standpoint of possibly damaging the cylinder by warpage or distortion. If hardening to full depth is desired, such can be done prior to applying the resist initially as in the Nelson application Serial No. 668,377, filed June 27, 1957, now Patent No. 3,048,512.

With cylinder 10 hardened, an embossing roll with the stucco or like pattern is thereby provided. This roll may be employed with a smooth surface back-up roll to effect a single side embossing of sheets of material, but as is well known better embossing effects are produced by embossing the sheets from both sides. This requires that a matingly matched second embossing roll be used with embossing roll 10. To make this second embossing roll, the steps referred to in FIGURES 6–10 of the above mentioned Sunderhauf et al. patent may be employed. Briefly, this includes uniformly coating a second smooth cylinder with an acid resist, and gearingly rolling the first embossing roll in pressure contact with the resist coated second cylinder, to remove certain regions of the resist. This is then followed by an etching and washing process, as well as a repeat of such steps are desired, following which the second roll is hardened, preferably in the same manner as indicated in FIGURE 8 of this specification.

A sample of the product which the mated embossing rolls of the present invention will then produce is effected, and this sample is inspected to determine whether either or both embossing rolls tend to damage or actually damage the sample in any manner as by cutting or otherwise fracturing the sample. If such is the case, then the roll or rolls that have the defect producing metal area is or are subjected to an edge rounding process, such as an overall etching of the roll or rolls in question, or a touch-up by the wire brush wheel 32 shown in FIGURE 7. The defect metal of the rolls is thereby removed, and the mated embossing rolls may be utilized to produce any desired amount of product with a stucco or like pattern.

From the foregoing description it will be appreciated that the objects and advantages set forth for this invention have been fully achieved. Modifications will become apparent to those of ordinary skill in the art after reading this disclosure, and it is to be understood that the invention is not necessarily limited to details described, since the spirit and scope of the invention is defined by the appended claims.

What is claimed is:

1. A process for manufacturing an embossing roll having a stucco pattern comprising the steps of:
    (a) sponging dabs of an etching resist over the cylindrical surface of a metal cylinder randomly to effect a multiplicity of randomly configured and randomly located exposed metal areas on said surface,
    (b) etching said areas to remove metal therefrom,
    (c) repeating steps (a) and (b) a desired number of times to effect the desired pattern and its depth,
    (d) removing the remaining resist from the etched cylinder after step (c), and then
    (e) removing from the cylinder sharp edges while retaining the said desired pattern by relatively rotating the cylinder and a flexibly shafted wire brush wheel against each other.

2. A process as in claim 1 including between at least some of the steps (a) and (b), the further step of:
    (a1) manually removing a spot of said resist in at least one area thereof which area is larger than other surrounding areas thereof to effect at least one other exposed metal area.

References Cited by the Examiner
UNITED STATES PATENTS

| | | | |
|---|---|---|---|
| 516,469 | 3/1894 | Bradley | 156—8 |
| 747,791 | 12/1903 | Southwood | 156—14 |
| 1,453,076 | 4/1923 | Levine | 156—8 XR |
| 1,974,011 | 9/1934 | Burgess | 156—13 XR |
| 2,662,002 | 12/1953 | Sunderhauf et al. | |
| 2,955,027 | 10/1960 | Newell et al. | |

FOREIGN PATENTS

| | | |
|---|---|---|
| 811,634 | 4/1959 | Great Britain. |
| 814,565 | 6/1959 | Great Britain. |

ALEXANDER WYMAN, *Primary Examiner.*

JACOB STEINBERG, *Assistant Examiner.*